M. MEYER & T. KENNE.
TONGUE SUPPORTING AND LOCKING MEANS.
APPLICATION FILED MAR. 26, 1908.

902,100.

Patented Oct. 27, 1908.

2 SHEETS—SHEET 1.

Witnesses
Louis A. Heinrichs
C. H. Griesbauer

Inventors
Theodore Kenne
Max Meyer
by H. R. Wilson & Co.
Attorneys

M. MEYER & T. KENNE.
TONGUE SUPPORTING AND LOCKING MEANS.
APPLICATION FILED MAR. 26, 1908.
902,100.
Patented Oct. 27, 1908.
2 SHEETS—SHEET 2.
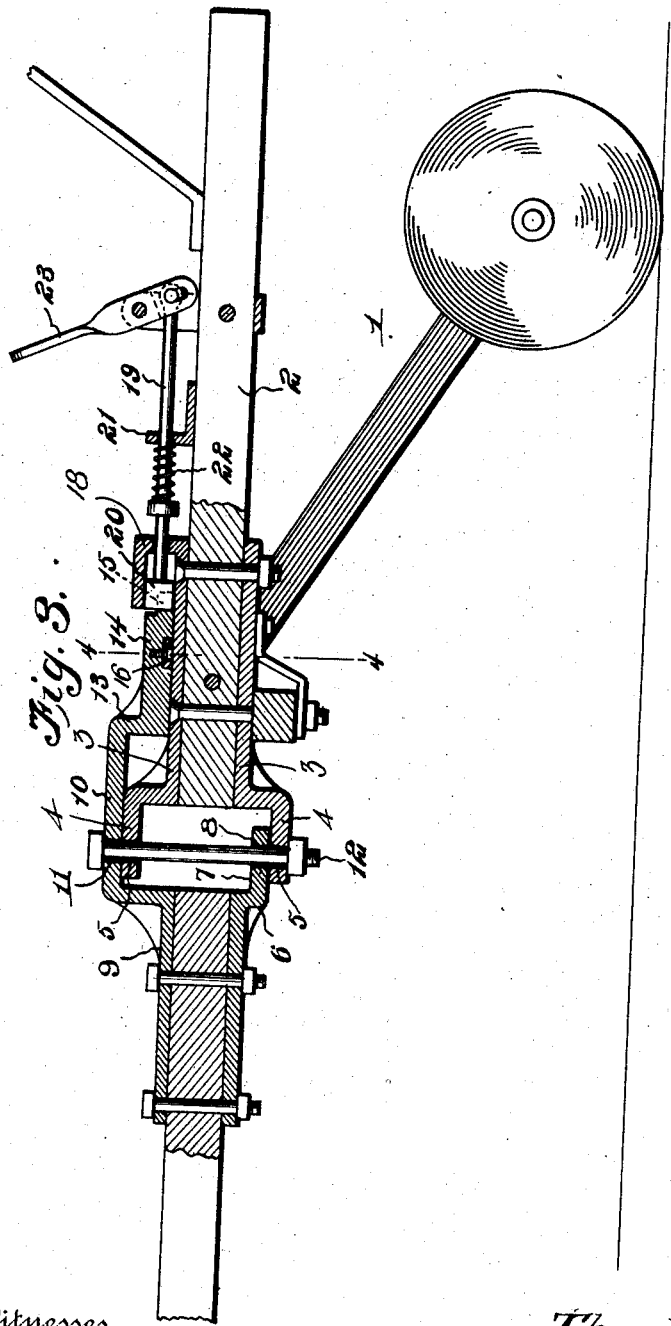
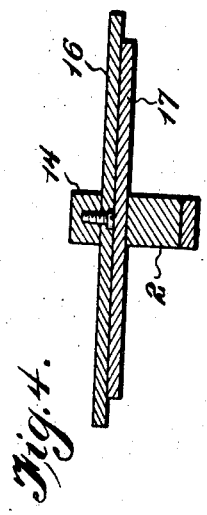
Witnesses
Louis R. Heinrichs
C. H. Giestauer
Inventor
Theodore Kenne
Max Meyer
by H. B. Willson & Co.
Attorneys
THE NORRIS PETERS CO., WASHINGTON, D. C.

UNITED STATES PATENT OFFICE.

MAX MEYER AND THEODORE KENNE, OF LUVERNE, IOWA.

TONGUE SUPPORTING AND LOCKING MEANS.

No. 902,100.  Specification of Letters Patent.  Patented Oct. 27, 1908.

Application filed March 26, 1908. Serial No. 423,448.

*To all whom it may concern:*

Be it known that we, MAX MEYER and THEODORE KENNE, citizens of the United States, residing at Luverne, in the county of Kossuth and State of Iowa, have invented certain new and useful Improvements in Tongue Supporting and Locking Means; and we do declare the following to be a full, clear, and exact description of the invention, such as will enable others skilled in the art to which it appertains to make and use the same.

This invention has relation to improvements in tongue supporting and locking means.

The object of the invention is the production of simple and economical means, whereby a tongue may be hingedly supported in position to an agricultural or other device, and of means to normally lock the tongue with the vehicle, but which may be actuated to release the tongue to permit it to swing in a horizontal plane, relative to the device to which it is attached in such cases where this would be desirable, as in turning corners at the end of a field where the ground is muddy and a turn consequently difficult to make with the tongue locked with the device.

With the foregoing and other objects in view, the invention consists of certain novel features of construction, combination and arrangement of parts, as will be more fully described and particularly pointed out in the appended claims.

Figure 1:
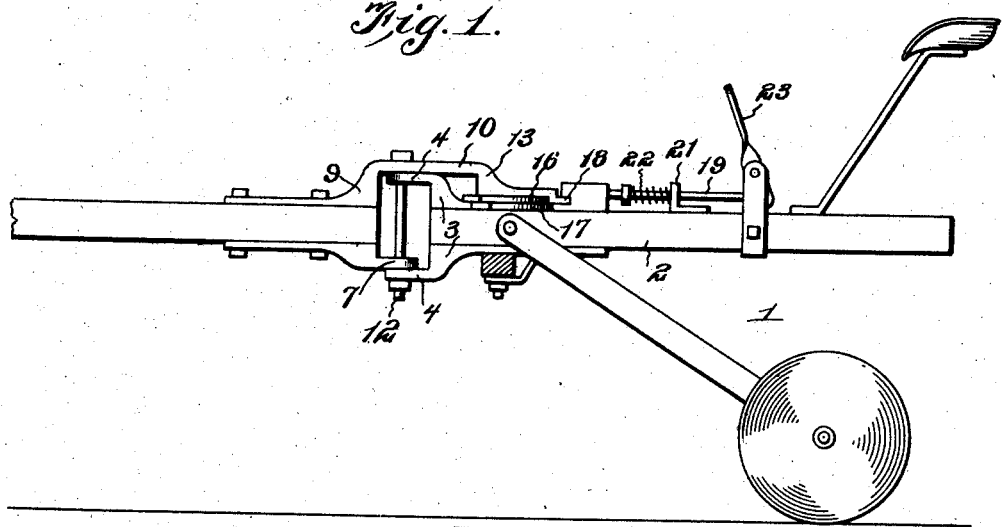
Figure 2:
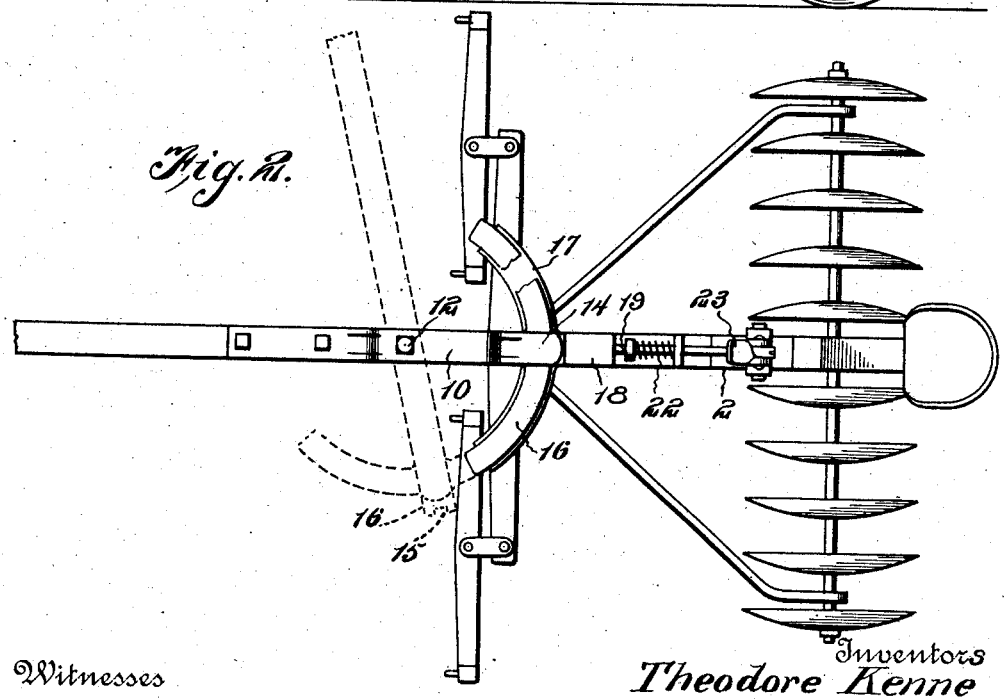

In the accompanying drawings: Figure 1 is a view in side elevation of the invention applied to an ordinary disk plow or cultivator. Fig. 2 is a plan view, part broken away, and the position of the tongue, when swung at an angle to the cultivator being indicated by dotted lines. Fig. 3 is a central longitudinal, vertical sectional view; and Fig. 4 a cross section taken on the line 4—4 of Fig. 3.

In the accompanying drawings, which are for illustrative purposes only, and therefore not drawn to any particular scale, the numeral, 1, indicates an ordinary disk plow or cultivator which is of any ordinary construction and as it does not constitute a part of the invention, but is simply illustrated to enable a clear conception of the invention possible, will not be described, specifically. 2, indicates the cultivator beam, which in carrying out the invention, is provided at its front end and on opposite faces with forwardly extending bearing members, 3, of approximately right triangular form which are arranged with their front ends or portions, 4, in a horizontal plane. These portions are provided with vertically alined apertures, 5, the purpose of which will be shown.

As shown in the drawings, the tongue is provided at its inner or rear end and at its under face with a bearing member, 6, of approximately triangular form, which is arranged with its inner or rear portion, 7, in a horizontal plane and to bear on the upper face of the lower supporting member, 3, of the cultivator beam, said portion having a central vertical aperture, 8, to aline with the aperture of such supporting member. The tongue is also provided at its inner or rear end on its top or upper face with a bearing member, 9, of approximately right triangular form the inner arm or portion, 10, of which is arranged to bear on the upper supporting member, 3, of the cultivator beam and is provided with a vertical aperture, 11, to aline with the aperture thereof.

In practice, a vertically disposed pivot member, 12, is arranged to have its ends extend through the apertures of the supporting and bearing members, of the cultivator beam and tongue, respectively, and constitutes a means for hinging the tongue in position. This pivot member is preferably in the form of a bolt and is retained in removable position by a nut 12. The arm or portion, 10, of the bearing member, 9, projects slightly beyond the upper bearing member, 3, of the cultivator beam and is provided at its projecting end with a locking member, 13, of approximately right triangular form, the rear arm or portion, 14, of which is arranged to bear upon the upper face of the cultivator beam and is provided with a central notch or recess, 15, in its rear end, the purpose of which will be disclosed. An arc shaped plate or member, 16, fits in a corresponding recess in the under face of the arm or portion, 14, of the locking member, 13, and is adapted to bear on a corresponding plate or member, 17, formed near the rear end of the upper bearing member 3. A keeper 18 is formed at the rear end of the upper bearing member 3 and extending through said keeper is a longitudinal latch bolt 19, having a head or engaging portion, 20, at its front end for normally engaging in the recess, 15, of the locking member, 13, to maintain the tongue in a locked position. The rear end of the latch bolt extends through a corresponding aperture or opening in an upright guide, 21, mounted on the cultivator beam in rear of the keeper and fixed at its front end to the latch bolt and arranged to have its opposite end engage the guide, 21, is a coil spring, 22, the normal tendency of which is to hold the head or engaging portion of the latch bolt in engagement with the recess, 15. An upright foot lever or treadle, 23, is pivoted intermediately of its ends on the cultivator beam in rear of the guide, 21, and is connected at its inner end with the inner or rear end of the locking pin by means of which the locking pin may be disengaged with the recess, 15, to permit the tongue to swing in a horizontal plane.

From the foregoing description taken in connection with the accompanying drawings, the construction and operation of the invention will be readily understood without requiring a more extended explanation.

Having thus described the nature of our invention, what we claim as new and desire to secure by Letters-Patent, is:

The combination with a cultivator beam, of a tongue hinged thereto, a bearing member having an arc-shaped bearing plate arranged at the front end and on the upper face of the cultivator beam, a second bearing member mounted upon the upper face and at the rear end of the tongue and having a rearwardly extending locking portion adapted to bear upon said first mentioned bearing member, an arc-shaped bearing plate carried by said locking portion to bear upon said first mentioned bearing plate, and locking mechanism sustained by the cultivator beam for normally holding the locking portion of said second named bearing member in fixed relation with the cultivator beam.

In testimony whereof we have hereunto set our hands in presence of two subscribing witnesses.

MAX MEYER.
THEODORE KENNE.

Witnesses:
I. P. HARRISON,
H. J. KENNE.